United States Patent Office 3,507,615
Patented Apr. 21, 1970

3,507,615
METHOD OF PRODUCING MANGANESE CARBONYL
Seiji Usami and Kotaro Nishimura, Saitama, and Yuzo Koga, Tokyo, Japan, assignors to Toa Nenryo Kogyo Kabushiki Kaisha, Tokyo, Japan, a corporation of Japan
No Drawing. Filed Jan. 30, 1967, Ser. No. 612,312
Claims priority, application Japan, Jan. 31, 1966, 41/5,484; Oct. 17, 1966, 41/6,821
Int. Cl. G01g 45/04
U.S. Cl. 23—203      8 Claims

ABSTRACT OF THE DISCLOSURE

Method of producing manganese carbonyl comprising reacting a halide, oxide, hydroxide, inorganic acid salt, organic acid salt or organic complex salt of manganese or mixture thereof with carbon monoxide in the presence of hydrogen in an inert solvent and in the presence of a catalyst of an organic or inorganic salt of platinum or palladium at a temperature from about 40 to 250° C. The catalyst may be supported on a carrier such as alumina, clay, chrome oxide, titanium oxide, calcium carbonate or carbon.

---

This invention relates to a method of producing manganese carbonyl and more particularly to a method of producing manganese carbonyl from metallic manganese or manganese compounds in the presence of a catalyst.

To produce manganese carbonyl, there are known some methods such as a method using copper iodide and metallic magnesium (J. Am. Chem. Soc., 76, 3831 (1954)); a method using benzophenone and metallic sodium (J. Am. Chem. Soc., 80, 6167 (1958)); a method using trialkylaluminum (J. Am. Chem. Soc., 82, 1325 (1960)); and a method wherein metallic magnesium is reacted in the solvent dimethylformamide (Z. Naturforsch., 17b, 791 (1962)).

These methods, however, possess some defects in practice. For example, a large amount of an expensive reaction reagent is required or the reaction conditions or the yield are not satisfactory.

Contrary to the above methods which all employ reducing agents as a reaction reagent, the method of this invention is based on a substantially different principle. The reaction of this method is performed catalytically, which assures cost savings, easy operation and many advantages in the industrial production. In the catalytic method of this invention, metallic manganese or a manganese compound is reacted with carbon monoxide in the presence of hydrogen and, as a catalyst, a substance containing noble metals such as palladium or platinum.

As the manganese compounds, there can be used manganese halides, manganese oxide, manganese hydroxide and other inorganic and organic salts of manganese, such as a salt of a lower organic acid, for example, the acetate and propionate salts, or a salt of a fatty acid such as the oleate, stearate, palmitate, naphthenate and linoleate salts or salt mixtures thereof, a salt of an organic complex, such as acetylacetonate salts and other manganese compounds which can be converted to the carbonyl compound in the reaction zone of the present invention. Particularly, fatty acid salts of manganese are preferable.

The palladium and platinum containing substances to be used herein, can be for example, palladium black, platinum black or palladium or platinum supported on a carrier such as alumina, acid clay, calcium carbonate, chrome oxide, silica-alumina, titanium oxide and carbon. Any other palladium or platinum containing substances, such as inorganic or organic salts of these metals, can be optionally selected depending on the solvent to be used and other reaction conditions. Palladium or platinum supported on a carbon carrier is most active and is preferable in practice.

The amount of palladium or platinum supported on the carrier is in the range from 0.5 to 15% by weight, preferably from 3 to 10% by weight, based on the weight of the carrier. The amount of these metals employed in the reaction is in the range from 0.005 to 0.1 mol, preferably from 0.01 to 0.08 mol, per 1 mol of manganese employed. As the solvents to be employed in the present method, there may be used all the substances that are inert in the carbonylization reaction of manganese, such as saturated hydrocarbons, alcohols and ethers, and they do not inhibit the catalytic action of the palladium or platinum containing substances previously described. However, considering the reactivity, polar solvents such as tetrahydrofuran, alcohols or ethers, are preferable.

For producing manganese carbonyl by the method of the present invention, a manganese-containing substance, preferably a fatty acid salt of manganese, is introduced together with the above-mentioned solvent into the reaction zone in which is present a palladium- or platinum-containing substance, such as palladium supported on carbon or platinum supported on carbon. A gas mixture of carbon monoxide and hydrogen is supplied to the reaction zone under a pressure of 30–200 kg./cm.$^2$, preferably 100 kg./cm.$^2$ as above, and the temperature is kept at 40–250° C., preferably 150–220° C.

The reaction is smoothly carried out and manganese carbonyl can be obtained with a good yield.

Examples of the method according to the present invention are described below.

EXAMPLE 1

76.5 g. of the later-described fatty acid salt of manganese, a palladium/carbon catalyst (containing 5% Pd) equivalent to 0.462 g. of palladium and 100 ml. of diglyme as a solvent were weighed and were placed in an autoclave of 500 ml. capacity and equipped with electromagnetic stirrer. A synthesis gas ($H_2/CO=1:3$) was fed into the autoclave under an initial pressure of 150 kg./cm.$^2$.

The contents were heated at a rate to provide a temperature rise of 0.8° C. per minute while being stirred. When a tempreature of 200° C. was reached, a pressure drop was seen.

The contents were kept at 200° C. for 10 hours.

After being cooled, the contents of the autoclave were taken out. The yield of manganese carbonyl was determined to be 14.5% using the carbonyl analyzing method (reported by I. Wender: Anal. Chem. 24, 174 (1952)).

When the reaction was carried out in the absence of the catalyst under the same conditions, manganese carbonyl was not obtained. Also, it was not detected by infrared spectroscopy.

The above-mentioned palladium/carbon catalyst was prepared in the following manner:

Commercial available active carbon (of about 100 to 300 mesh size) was heated together with 10% nitric acid on a water bath for about two hours. After filtering, it was water-washed and dried at 100 to 110° C. and 93 g. of the obtained product were put in a 4 liter beaker and heated up to 80° C. together with 1.2 liters of water. Then 8.2 g. (0.046 mol) of palladium chloride which had been dissolved in 20 ml. of concentrated hydrochloric acid and 50 ml. of water was added. After adding and blending 8 ml. of 37% formalin aqueous solution, a 30% caustic soda solution was added to the obtained suspension until it showed weakly alkaline on a litmus paper. It is heated for 5 minutes and was agitated. The suspension is filtered off, water-washed and dried.

The fatty acid salt of manganese used in this example was a commercially available manganese soap (containing 60% manganese). The fatty acid composition of the soap was 50% oleic acid, 40% linolic acid and the balance stearic acid, myristic acid, palmitic acid and linoleic acid.

EXAMPLE 2

The reaction was carried out under the same conditions as those of Example 1 using platinum/carbon catalyst (containing 5% Pt) equivalent to 0.17 g. of platinum.

The pressure drop was shown when the temperature reached 200° C. and the contents were kept at the same temperature for 10 hours.

A yield of 7.2% of manganese carbonyl was obtained.

The platinum/carbon catalyst was prepared in the following manner:

95 g. of commercially available active carbon was heated together with 10% nitric acid on a water bath for about 2 hours, and was then filtered, water-washed and kneaded with some water. Chloroplatinic acid solution containing 5% platinum was added and the obtained mixture was heated to 50° C. on a water bath for 3 hours. After cooling and adding concentrated sodium carbonate solution to the mixture to make same alkaline, excess hydrazine hydrate was mixed and the mixture warmed for 1 to 2 hours to complete the reduction of platinum contained in the mixture. The mixture was filtered off, warm-washed and dried with calcium chloride in a desiccator.

EXAMPLE 3

Manganese carbonyl was synthesized under the same conditions as in Example 1 except that 100 ml. of tetrahydrofuran, toluene and ethyl alcohol were employed as solvents instead of diglyme.

The yield was as follows:

Manganese carbonyl yield (percent):
    Tetrahydrofuran _____ 5.1
    Toluene _____ 0.5
    Ethyl alcohol _____ Trace Although particular preferred embodiments of the invention have been disclosed above for illustrative purposes, it will be understood that variations or modifications therein which lie within the scope of the appended claims are fully contemplated.

The embodiments of the invention in which an exclusive property or privilege is claimed are defined as follows:

1. The method of producing manganese carbonyl which comprises reacting (1) a manganese compound selected from the group consisting of the manganese halides, manganese oxide, manganese hydroxide and inorganic acid salts, organic acid salts and organic complex salts of manganese and mixture thereof, and (2) carbon monoxide, in the presence of hydrogen, in an inert organic solvent and in the presence of a catalyst selected from the group consisting of palladium and platinum and their inorganic and organic salts.

2. The method according to claim 1 wherein said palladium catalyst is a member selected from the group consisting of palladium black, palladium on alumina, palladium on clay, palladium on chrome oxide, palladium on titanium oxide, palladium on calcium carbonate, palladium on carbon, an inorganic salt of palladium and an organic salt of palladium.

3. The method according to claim 1 wherein said palladium catalyst is palladium on carbon.

4. The method according to claim 1 wherein said platinum catalyst is a member selected from the group consisting of platinum black, platinum on alumina, platinum on clay, platinum on chrome oxide, platinum on carbon, platinum on calcium carbonate, an inorganic salt of platinum and an organic salt of platinum.

5. The method according to claim 1 wherein said platinum catalyst is platinum on carbon.

6. The method according to claim 1 wherein said manganese compound is a fatty acid salt of manganese.

7. The method according to claim 1 wherein said inert organic solvent is a member selected from the group consisting of a hydrocarbon, an alcohol and an ether.

8. The method according to claim 1 wherein the reaction temperature is in the range of from about 40 to 250° C. and the pressure is in the range of from about 30 to 200 kg./cm.$^2$.

References Cited

UNITED STATES PATENTS

| | | | |
|---|---|---|---|
| 2,952,520 | 9/1960 | Podall et al. | 23—203 |
| 2,963,346 | 12/1960 | Ecke | 23—203 |
| 3,028,220 | 4/1962 | Giraitis et al. | 23—203 |

EARL C. THOMAS, Primary Examiner